Feb. 11, 1947.     E. BOSSI     2,415,622
HELICOPTER ANTI-TORQUE PROPELLER SYSTEM
Filed Jan. 18, 1944     2 Sheets-Sheet 1
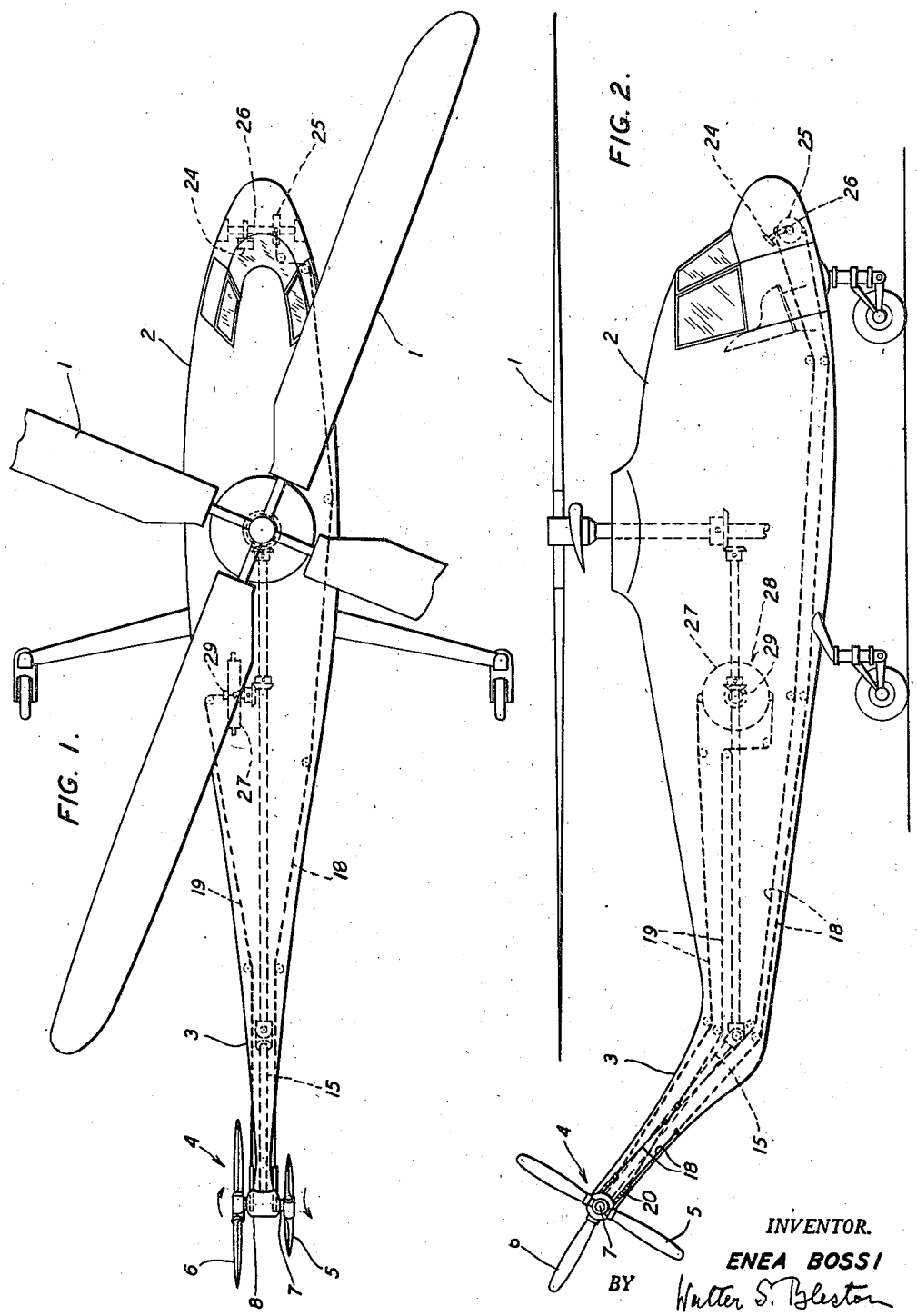
INVENTOR.
ENEA BOSSI
BY Walter S. Bleston
ATTORNEY Feb. 11, 1947.  E. BOSSI  2,415,622
HELICOPTER ANTI-TORQUE PROPELLER SYSTEM
Filed Jan. 18, 1944  2 Sheets-Sheet 2

INVENTOR.
ENEA BOSSI
BY Walter S. Bleston
ATTORNEY

Patented Feb. 11, 1947

2,415,622

UNITED STATES PATENT OFFICE 2,415,622

HELICOPTER ANTITORQUE PROPELLER SYSTEM

Enea Bossi, New York, N. Y.

Application January 18, 1944, Serial No. 518,636

2 Claims. (Cl. 244—17)

This invention relates to an anti-torque propeller system for rotary wing aircraft. The conventional arrangement of an anti-torque propeller on the one side of the tail end of the fuselage of a rotary wing aircraft, such as a helicopter or autogyro, has a number of drawbacks. On the one hand, the weight of the propeller supported in cantilever fashion creates a torque tending to twist the fuselage tail and thus is the cause of more or less severe vibrations. Furthermore, in many cases it is necessary to lengthen the tail beyond its otherwise desired size in order to ensure that an anti-torque propeller of desired diameter does not interfere with the blades of the sustaining rotor of the craft.

The invention contemplates, therefore, the provision of an anti-torque propeller system whereby the mentioned drawbacks may be eliminated or at least greatly reduced, and whereby certain advantages may be gained which cannot be obtained by the conventional device and arrangement. The invention consists in that an anti-torque propeller is provided on each side of the tail end of the fuselage so that the propellers rotate in opposite directions about a common axis transverse with respect to the fuselage. This arrangement balances torques caused by the weight of the propellers and renders it possible to do with propellers of smaller diameter than required if only one anti-torque propeller is used, so that in many instances the length of the fuselage tail may be also reduced. My invention further consists in that both propellers are of the variable pitch type so that their pitch may be controlled in flight, either together or independently of each other. The invention also consists in that one of such pair of independently controlled anti-torque propellers is subject to automatic pitch control under the action of a gyro whereas the pitch of the other propeller is operator-controlled.

Further details and objects of the invention will be apparent from the description given hereinafter and the accompanying drawings illustrating an embodiment thereof by way of example. In the drawings:

Fig. 1 is a diagrammatical top plan view of a rotary wing aircraft with an anti-torque propeller system according to my invention;

Fig. 2 is a side elevation thereof;

Figure 3:
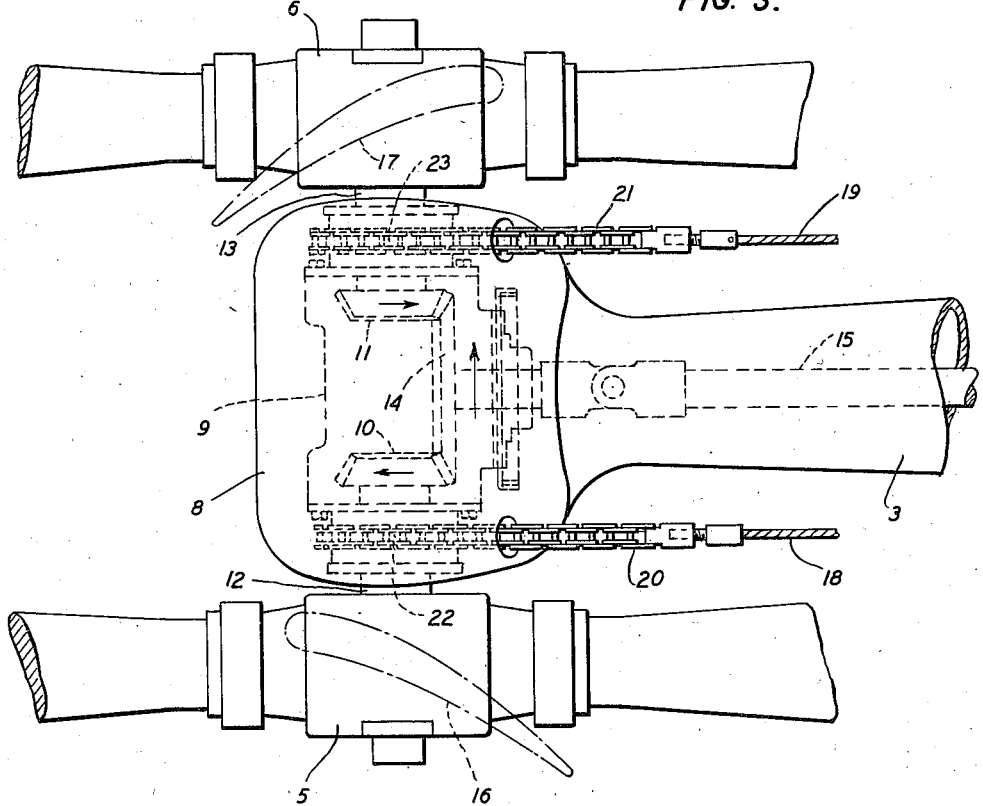
Fig. 3 is a top plan view of the tail end of the craft on a larger scale.

Referring now to the drawings, the rotary wing aircraft comprises the sustaining rotor 1 and the fuselage 2 with its tail 3, carrying the anti-torque propeller system 4. This system comprises the two propellers 5 and 6, respectively arranged on both sides of the end of the tail 3 and rotatable in opposite directions about their common axis 7. In the illustrated embodiment the tail 3 is substantially tubular-shaped with an enlargement 8 at its end interiorly of which a gear box 9 is provided as clearly shown in Fig. 3. The gear box 9 contains bevel gears 10 and 11 secured to the stub axles 12 and 13 of the propellers 5 and 6 respectively, and meshing with the bevel drive wheel 14. Wheel 14 is mounted on a drive shaft 15 which extends interiorly of and through the length of the tail 3 into the fuselage 2. The shaft 15 may be driven as well known in the art by any suitable power source, e. g. by a motor (not shown) of the craft or by the sustaining rotor 1 as indicated in Fig. 1. In Fig. 3 the contours of two propeller blades 16 and 17 in similar positions are entered in dash and dot lines. From a comparison of the two it will be clear that the propellers will rotate in opposite directions both with thrusts towards the right hand side of the craft. The propellers are of the variable pitch type and may be of any suitable and conventional design. Variation of pitch can be accomplished by operating the control cable 18 for propeller 5 and control cable 19 for propeller 6. The cables are connected to chains 20 and 21 respectively, which cooperate with rotatable, teethed elements 22 and 23 of the pitch varying mechanism interiorly of the propeller hubs.

Figure 4:
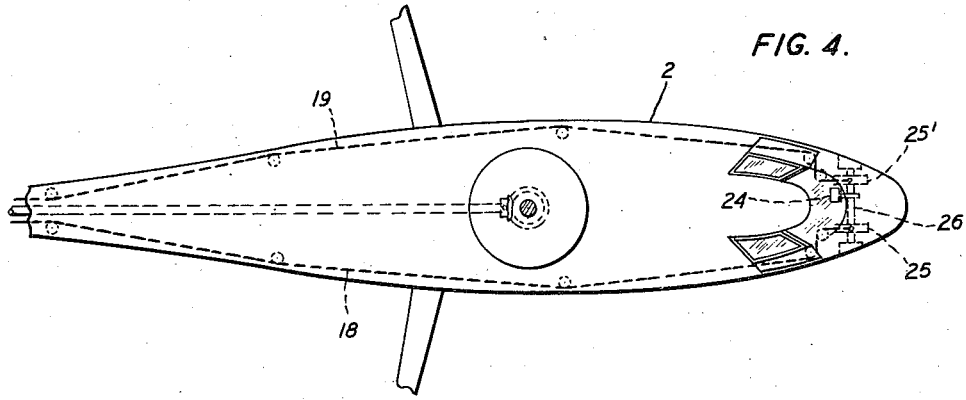
Fig. 4 is a view similar to Fig. 1 and illustrating a modification of the control of the pitch variation.

The invention contemplates the possibilities of jointly varying the pitch of both propellers and of varying the pitch of the one propeller independently from that of the other. In order to effect joint variation, both cables 18 and 19 may be operated, e. g. by means of a pedal 24 and cable discs 25 and 25' mounted on the same axle 26. This is indicated in Fig. 4, where cable 18 runs on disc 25, and cable 19 on disc 25'.

In the event of independent variation of pitch, one of the cables may be operated by means of a pedal arrangement similar to that just described, but with only one disc 25 on axle 26, whereas the other cable may be connected to any suitable and conventional control means. This is shown in Figs. 1 and 2 where according to my further invention, the mechanism for pitch variation of the one propeller is under the control of the pilot and the mechanism for pitch variation of the other propeller is automatically controlled by a gyro reacting on yawing movements of the fuselage. In the illustrated embodiment cable 18 associated with propeller 5 is attached to the disc 25 so that the pilot by using pedal 24 is enabled to vary the pitch of that propeller. The cable 19 of the other propeller 6 is connected to the non-rotatable but oscillatable part 27 of a gyro 28 which may be driven in conjunction with the rotor 1 so as to spin about a transverse axis 29. This arrangement will relieve the pilot of a considerable portion of the work necessary for the pitch control so that he will have to actuate the pedal 24 only if large alterations of the torque created by the anti-torque propeller system are required.

It will be clear to those skilled in the art that alterations and modifications of the structure shown may be made without departing from the spirit and essence of the invention, which shall be limited only by the scope of the appended claims.

I claim:

1. In a rotary wing aircraft including a fuselage, an anti-torque propeller system comprising two variable pitch propellers, one on each side of the tail of the fuselage, said propellers having a common axis intersecting at right angles the plane of the longitudinal and vertical axes of the fuselage and being so arranged and constructed as to create thrusts both in the same direction, a common drive shaft for said propellers in the tail of said fuselage, means substantially in the end of said fuselage tail to transmit driving torques to said propellers in opposite directions, two independent controls for varying the pitch of said propellers respectively, and means responsive to yawing motions of the fuselage and in connection with one of said controls to actuate the latter.

2. In a rotary wing aircraft including a fuselage, an anti-torque propeller system comprising two variable pitch propellers, one on each side of the tail of the fuselage, said propellers having a common axis intersecting at right angles the plane of the longitudinal and vertical axes of the fuselage and being so arranged and constructed as to create thrusts both in the same direction, a common drive shaft for said propellers in the tail of said fuselage, means substantially in the end of said fuselage tail to transmit driving torques to said propellers in opposite directions, a control gyro, means in connection with said gyro and one of said propellers for varying its pitch under the action of said gyro, and operator-controlled means for varying the pitch of the other propeller.

ENEA BOSSI.

REFERENCES CITED

The following references are of record in the file of this patent:

UNITED STATES PATENTS

| Number | Name | Date |
|---|---|---|
| 2,225,002 | Focke | Dec. 17, 1940 |
| 1,990,606 | Junkers | Feb. 12, 1935 |
| 1,806,648 | Salisbury et al. | May 26, 1931 |
| 1,707,690 | Sperry | Apr. 2, 1929 |
| 1,635,897 | Nelson | July 12, 1927 |
| 1,890,931 | Briner | Dec. 13, 1932 |